(12) United States Patent
Bihel et al.

(10) Patent No.: US 9,732,769 B2
(45) Date of Patent: Aug. 15, 2017

(54) SERVO-CONTROL AND AN AIRCRAFT HAVING SUCH A SERVO-CONTROL

(71) Applicant: AIRBUS HELICOPTERS, Marignane (FR)

(72) Inventors: Jean-Romain Bihel, Le Rove (FR); Thibaut Marger, Gignac-la-Nerthe (FR); Christophe Pujol, Vitrolles (FR); Alexandre Pantaine, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 79 days.

(21) Appl. No.: 14/989,105

(22) Filed: Jan. 6, 2016

(65) Prior Publication Data
US 2016/0195113 A1    Jul. 7, 2016

(30) Foreign Application Priority Data

Jan. 6, 2015 (FR) ..................................... 15 00010

(51) Int. Cl.
| F16D 31/02 | (2006.01) |
| F15B 11/10 | (2006.01) |
| B64C 27/12 | (2006.01) |
| B64C 13/42 | (2006.01) |
| F15B 9/10  | (2006.01) |
| F15B 18/00 | (2006.01) |

(52) U.S. Cl.
CPC .............. *F15B 11/10* (2013.01); *B64C 13/42* (2013.01); *B64C 27/12* (2013.01); *F15B 9/10* (2013.01); *F15B 18/00* (2013.01); *F15B 2211/321* (2013.01); *F15B 2211/8633* (2013.01); *F15B 2211/8752* (2013.01)

(58) Field of Classification Search
CPC .............. F15B 11/10; F15B 9/10; F15B 18/00
USPC ...................................... 91/392, 397; 60/463
See application file for complete search history.

(56) References Cited

U.S. PATENT DOCUMENTS

| 2,597,420 A | 5/1952 | Westbury |
| 2014/0003941 A1* | 1/2014 | Leclercq ................... B64C 3/40 |
| | | 416/23 |

FOREIGN PATENT DOCUMENTS

| GB | 627737 | 8/1949 |
| GB | 728142 | 4/1955 |

(Continued)

OTHER PUBLICATIONS

French Search Report for French Application No. FR 1500010, Completed by the French Patent Office on Oct. 28, 2015, 7 Pages.

*Primary Examiner* — Michael Leslie
*Assistant Examiner* — Daniel Collins
(74) *Attorney, Agent, or Firm* — Brook Kushman P.C.

(57) ABSTRACT

A servo-control having at least one movable cylinder that includes a hydraulic directional control valve. The hydraulic valve includes a control shaft that is rotatable about a longitudinal axis, the control shaft being connected to a distributor slide. The servo-control including a stationary abutment member secured to a cylinder and an input lever situated outside the cylinder. The input lever is connected to the control shaft and includes a stop portion arranged in the abutment member. The servo-control includes movement means for moving the input lever longitudinally, a first abutment surface of the abutment member limiting a travel amplitude of the stop portion when the input lever is in a first position.

17 Claims, 7 Drawing Sheets

(56) References Cited

FOREIGN PATENT DOCUMENTS

GB            744476       2/1956
GB            777273       6/1957

* cited by examiner

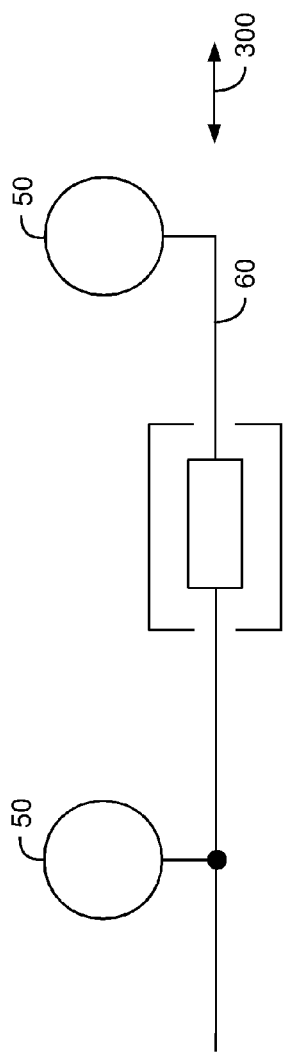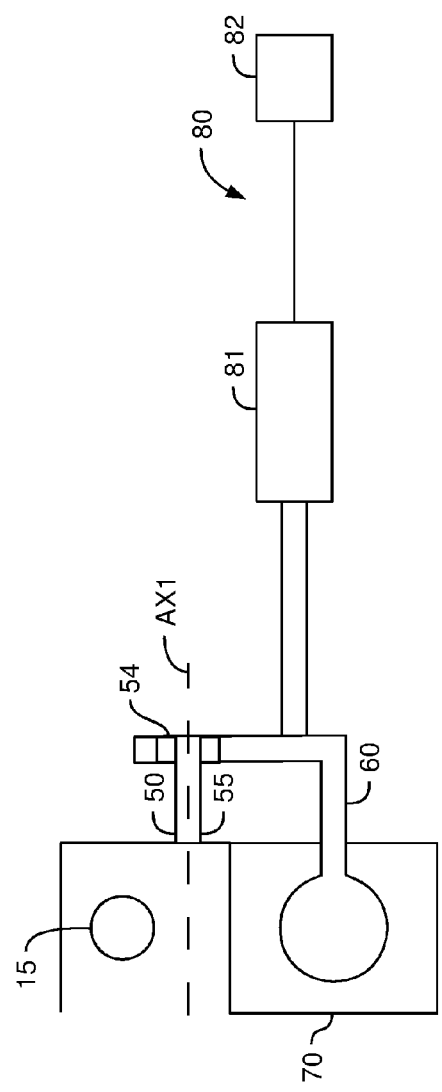

SERVO-CONTROL AND AN AIRCRAFT HAVING SUCH A SERVO-CONTROL

CROSS REFERENCE TO RELATED APPLICATION

This application claims priority to French patent application No. FR 15 00010 filed on Jan. 6, 2015, the disclosure of which is incorporated in its entirety by reference herein.

BACKGROUND OF THE INVENTION (1) Field of the Invention

The present invention relates to a servo-control, and to an aircraft having such a servo-control.

(2) Description of Related Art

Conventionally, an aircraft has control members, such as the blades of a rotor providing a rotorcraft with lift or indeed the control surfaces of an airplane, for example.

By using flight controls, a pilot controls the control members of the aircraft. Nevertheless, in order to move the control members it is sometimes necessary to deliver forces that are very large.

Consequently, the linkage connecting a flight control to a control member is sometimes provided with a hydraulic system for providing assistance. The hydraulic system comprises a servo-control enabling the pilot to control the aircraft without difficulty and accurately.

More particularly, a rotorcraft is provided with a main rotor that provides the rotorcraft with at least some of its lift and possibly also with propulsion. In order to control the rotorcraft, a pilot may in particular modify the pitch of the blades of the main rotor.

Consequently, the rotorcraft includes a set of swashplates comprising a non-rotary bottom swashplate and a rotary top swashplate. This set of swashplates is sometimes referred to by the person skilled in the art more simply as the "swashplates". The non-rotary bottom swashplate is connected to the pilot's flight controls, generally via at least three distinct control linkages, whereas the rotary top swashplate is connected to each of the blades via respective rods.

The pilot sometimes controls the set of swashplates via mechanical control. Nevertheless, the forces the pilot needs to exert in order to move the set of swashplates can be very large, in particular if the weight of the rotorcraft is also large.

Consequently, a servo-control is arranged between an upstream portion and a downstream portion of each control linkage in order to assist a pilot. The pilot then operates the servo-controls without applying significant force via the upstream portion, and then the servo-controls relay the order from the pilot and act on the downstream portion of the linkage.

Likewise a helicopter has a tail rotor in which the pitch of the blades can be adjusted via a servo-control in order to control yaw movements of the aircraft.

In conventional manner, servo-controls comprise a jack having at least an outer cylinder and a power rod. The power rod then includes one control piston per cylinder. Each control piston moves in an internal volume of a cylinder. Thus, each control piston defines a retraction chamber and an extension chamber inside each cylinder.

The term "retraction chamber" designates a chamber that causes the servo-control to retract when that chamber is filled with a fluid. Conversely, the term "extension chamber" designates a chamber causing the servo-control to extend when said chamber is filled with a fluid.

A servo-control is said to be a "movable-cylinder" servo-control when the power rod is held stationary by being anchored to a stationary structure of the aircraft. For example, the power rod may be anchored to a main power transmission gearbox. Under such circumstances, each cylinder slides along the power rod as a function of the pressures that exist in the retraction and extension chambers.

Conversely, a servo-control is said to be a "stationary cylinder" servo-control when each cylinder of the servo-control is held stationary. Under such circumstances, the power rod moves in translation relative to each cylinder as a function of the pressures in the retraction and extension chambers.

Furthermore, each cylinder has a hydraulic directional control valve for feeding the retraction chamber or the extension chamber in the cylinder with fluid depending on the received order.

A piloting order from a pilot is thus transmitted to the hydraulic valve, and it is the hydraulic valve that delivers fluid to the appropriate hydraulic chambers. Depending on the orders given, the hydraulic valve thus delivers hydraulic fluid to each retraction chamber or to each extension chamber, and consequently causes the servo-control to retract or extend.

On an aircraft, servo-controls having at least two cylinders are commonly used for controlling the blades of a main rotor, in particular for safety purposes. Thus, if one cylinder becomes inoperative, as a result of an accidental hydraulic leak, the servo-control remains operational.

Each cylinder is usually dimensioned to be capable of moving a control member even in the event of the other cylinder failing.

Furthermore, it is possible for the blades of the tail rotor to be controlled without hydraulic assistance. Under such circumstances, it is possible to use a single-cylinder servo-control. A failure of the servo-control is then not catastrophic.

Thus, in the event of a failure of a hydraulic system, a movable-cylinder servo-control may behave simply like a link. Each movable cylinder of the servo-control can then be moved by the pilot moving control means, even though the forces that the pilot needs to deliver are greater. In order to assist the pilot, it is then possible to implement a force compensator.

The state of the art includes a servo-control having a single movable cylinder that is provided with a hydraulic directional control valve having an input lever. The input lever is mechanically connected to control means that can be operated by a pilot.

Furthermore, the input lever is hinged directly to a distributor slide that is movable inside a housing of the hydraulic valve. Conversely, the input lever is situated outside that housing. Furthermore, the input lever has only a single degree of freedom to move in rotation relative to the housing.

The distributor slide may be a main slide, with an emergency slide being provided to enable the servo-control to operate in the event of the main slide jamming.

Consequently, a movement of the control means as a result of an order from a pilot causes the input lever to turn, thereby causing the distributor slide to move in translation. The position of the distributor slide within the housing of the hydraulic valve determines the pressures of the hydraulic fluid that exist in the retraction and extension chambers of the servo-control.

Furthermore, the servo-control includes a locking system to enable a servo-control to act as a link in the event of a hydraulic failure.

The locking system includes a movable abutment. This abutment is in the form of a locking finger that is movable between an extended position that it reaches in the absence of hydraulic pressure in the hydraulic valve, and a retracted position that it reaches when the hydraulic pressure exceeds a pressure threshold. A spring urges the locking finger towards its extended position.

The locking finger extends from a root projecting out from the valve housing to a head that slides in an intercommunication system of the hydraulic valve. The intercommunication system puts the retraction chamber and the extension chamber of a cylinder of the servo-control into hydraulic communication when the locking finger is in its extended position.

When the hydraulic pressure in the servo-control is greater than the pressure threshold, the hydraulic fluid present in the intercommunication system exerts a force on the locking finger that is greater than the force exerted by the spring. The locking finger is then in the retracted position and it does not impede the movement of the input lever relative to the hydraulic valve.

Furthermore, the head of the locking finger closes a channel of the intercommunication system in order to separate the retraction chamber hydraulically from the extension chamber of a cylinder of the servo-control.

When the hydraulic pressure becomes less than the pressure threshold, the spring moves the locking finger into the extended position. The root of the locking finger of the movable abutment then impedes movement of the input lever relative to the hydraulic valve by penetrating into a conical reception orifice in the input lever. Furthermore, the head of the locking finger no longer closes the channel of the intercommunication system. Under such circumstances, the retraction chamber and the extension chamber are in hydraulic communication.

Consequently, the position of the input lever is locked in a neutral position relative to the valve housing. A movement of the input lever thus causes the hydraulic valve to move together with the cylinder of the servo-control, in particular by means of the locking finger.

The path followed by forces through the servo-control nevertheless then gives rise to large local excess stresses on the locking finger.

Furthermore, during transitional stages between the extended and the retraced positions of the locking finger, the locking finger rubs with considerable friction against a bearing surface of the orifice for receiving the input lever, because of the particular path followed by the forces via the bearing surface. This friction can rapidly lead to the locking finger becoming damaged. Furthermore, the pilot sometimes senses jolting phenomena during the transitional stages, in particular when the locking finger and the orifice that receives it do not face each other exactly.

Furthermore, since the input lever is situated completely outside the valve housing, the reception orifice runs the risk of being clogged, at least in part, by deposits of unwanted material.

Document GB 728 142 describes a locking system.

That Document GB 728 142 describes a system having a first lever connected to flight controls and second lever connected to a control member. The first lever is hinged to the second lever and also to a hydraulic directional control valve and a movable rod of a servo-control.

Under such circumstances, a locking system includes an angled lever in order to secure the first lever to the second lever.

Document GB 744 476 describes a servo-control having a movable cylinder. Under such circumstances, a piston defines a retraction chamber and an extension chamber that are in fluid flow communication with a hydraulic directional control valve of the servo-control.

That hydraulic valve has a locking system provided with a non-return hydraulic device.

Documents GB 627 737, U.S. Pat. No. 2,597,420, and GB 777 273 are also known.

BRIEF SUMMARY OF THE INVENTION

An object of the present invention is thus to provide a servo-control seeking to reduce at least some of the above-mentioned drawbacks encountered as a result of using a movable locking finger.

According to the invention, a servo-control is provided with at least one movable cylinder and a stationary power rod, the power rod having one piston per cylinder, each piston defining a chamber referred to as a "retraction" chamber and a chamber referred to as an "extension" chamber in a casing of the cylinder.

Each cylinder includes a hydraulic directional control valve provided with at least one hydraulic inlet suitable for being connected to a fluid delivery system and at least one hydraulic outlet suitable for being connected to a fluid discharge system, each hydraulic valve of a cylinder comprising at least one hydraulic distributor slide movable within said hydraulic valve in order to put each chamber of the cylinder into fluid flow communication with the hydraulic inlet or the hydraulic outlet on request.

The hydraulic valve has a control shaft that is rotatable about a longitudinal axis, the control shaft being connected to the distributor slide of the hydraulic valve so that turning of the control shaft leads to a movement of the distributor slide.

The servo-control includes an input lever situated outside each cylinder, the input lever being connected to the control shaft and being movable with a first movement to enable the control shaft to perform a rotary turn, said input lever being suitable for being connected to linkage generating an order to move the servo-control, the servo-control including a stationary abutment member secured to at least one cylinder, the abutment member being provided with at least one first abutment surface, the input lever including a stop portion co-operating with the abutment member, the servo-control including movement means for moving the input lever in a second movement in longitudinal translation from a first position to a second position and vice versa as a function of a predetermined condition, the first abutment surface limiting constraint-free movement of said stop portion during the first movement to a first amplitude solely when said input lever is in the first position.

The distributor slide may comprise a single slide, or it may comprise a main slide associated with an emergency slide in accordance with the teaching of certain known servo-control s.

Unlike certain teaching, the input lever of the servo-control thus moves the distributor slide indirectly via a control shaft that is interposed between the input lever and the distributor slide. The input lever is hinged to a linkage, e.g. controlled by a pilot-operable control.

The input lever is also movable so as to be able to perform a first movement. This first movement may be in the form of a rotary turn or a transverse movement in translation so as to cause the control shaft to turn on an order from the linkage. Furthermore, the input lever is movable with a second movement that is distinct from the first movement. The second movement is a movement in longitudinal translation, i.e. in a longitudinal direction.

The input lever also has a stop portion that moves within an abutment member secured to a cylinder of the servo-control when the input lever is in the first position.

The term "stop portion" means a portion of the input lever that can come to bear against the abutment member.

The abutment member has at least one surface suitable for constraining the movement of the input lever in response to an order from the linkage. Thus, the abutment member includes at least one "first" abutment surface.

The term "abutment surface" thus designates a surface of the abutment member against which the stop portion of the input lever can come to bear.

Depending on the longitudinal position of the input lever, the stop portion either faces or does not face the first abutment surface. When the stop portion faces the first abutment surface, this first abutment surface limits the constraint-free travel in the first movement of the input lever to a "first" amplitude.

The term "constraint-free travel" means that the travel of the input lever is not constrained by the abutment member. Under such circumstances, so long as the input lever is moved within the limits of the first amplitude, the input lever is not constrained by the abutment member, the input lever not coming into contact with the abutment member. The term "constraint-free travel" thus refers to travel of the input lever that does not lead to a movement of the abutment member.

With a single-cylinder servo-control, the first amplitude is minimized. For example, the input lever may then perform the first movement in two opposite directions over a first amplitude of plus or minus one millimeter from a neutral position. The term "amplitude" thus designates the extent of the travel of the input lever in either direction from the neutral position.

This first amplitude is sufficient to center the stop portion within the first abutment surface when subjecting the servo-control to hydraulic pressure.

If the input lever is not centered, then the distributor slide puts one of the chambers of the cylinder into communication with the hydraulic inlet. Hydraulic fluid is then delivered to one of the chambers. The pressure increases in that chamber, which leads to the moving cylinder moving in translation relative to the power rod, and also relative to the input lever. The cylinder is moved in translation until the distributor slide interrupts the delivery of hydraulic fluid to the chambers. This interruption occurs when the stop portion is centered in the first abutment surface.

Under such circumstances, a movement of the input lever in longitudinal translation can be performed in order to move the stop portion away from the first abutment surface, e.g. in order to increase the amplitude of the constraint-free travel available for the input lever.

Since the input lever is centered in the abutment member, the input lever travels without friction against the abutment member. No mechanical part is then subjected to damaging friction during the movement in longitudinal translation of the input lever, e.g. from the first position to the second position.

Furthermore, this movement in translation tends to take place smoothly without jolting.

Furthermore, in the event of the servo-control failing, or in the event of the fluid delivery system failing, for example, the input lever is arranged in the first position. Under such circumstances, a movement of the input lever over an amplitude greater than the first amplitude causes the input lever to come to bear against the abutment member.

The pilot feels this bearing thrust. Nevertheless, the pilot can increase the force exerted on control means in order to continue moving the input lever while also moving the abutment member. Such travel of the input lever is then constrained by the abutment member. Nevertheless, the force that needs to be exerted in order to move the cylinder is of a magnitude that can be exerted by a pilot.

Under such circumstances, when the input lever reaches the abutment member, the input lever can exert a force directly on the abutment member, which is then transferred by solid connection to the cylinder of the servo-control. The cylinder of the servo-control then behaves like a link.

Causing the forces to follow this path tends to minimize any risk of penalizing excess mechanical stresses being created locally.

Consequently, a movement of the linkage causes the cylinder of the servo-control to move by acting successively on the input lever and on the abutment member. The cylinder behaves like a link in this configuration.

The invention may also be applied to a servo-control having at least two cylinders.

Such a servo-control has at least two cylinders, with each cylinder being supplied with hydraulic fluid via its own hydraulic circuit.

Under such circumstances, the input lever can co-operate with the control shaft of each cylinder.

When all of the cylinders are being supplied properly with hydraulic fluid, the input lever is to be found in its first position, for example. The constraint-free travel of the input lever is limited to a first amplitude.

In contrast, when at least one cylinder is no longer properly supplied with hydraulic fluid, e.g. as a result of a failure, the input lever is moved into the second position in order to increase the constraint-free travel of that input lever so as to improve the performance of the cylinder that is still in operation.

The servo-control may also include one or more of the following characteristics.

Thus, the stop portion may include a hinge suitable for being connected to the linkage controlling the servo-control.

This stop portion is advantageously hinged to the linkage controlling the servo-control. Thus, in the event of the input lever breaking, the hinge of the input lever can be moved within the abutment member by the linkage in order to move the cylinder of the servo-control, where necessary, via the abutment member.

Furthermore, the abutment member may include a second abutment surface distinct from the first abutment surface, the second abutment surface limiting the travel amplitude of said stop portion during the first movement to a second amplitude when the input lever is in the second position, the second amplitude being different from the first amplitude.

This variant presents the advantage of adjusting the constraint-free stroke of the input lever as a function of at least one predetermined criterion.

Thus, the input lever may be in the first position below a pressure threshold, and in the second position above the pressure threshold.

With a single-cylinder servo-control, the constraint-free travel of the input lever in the first position is limited to the first amplitude in order to enable the input lever to be centered, and in order to cause the input lever to bear against the abutment member after a short stroke in the event of a hydraulic failure.

The second amplitude may then be greater than the first amplitude in order to optimize the performance of the servo-control while the servo-control is operating properly.

Conversely, on a servo-control having at least two cylinders, the second amplitude may be less than the first amplitude. The constraint-free travel of the input lever in the second position is limited to the second amplitude that is small in order to avoid obtaining servo-control that is too fast. In contrast, in the event of one of the cylinders having a hydraulic failure, the travel is increased to a first amplitude that is large in order to increase the performance of the still-active cylinder(s).

Optionally, said abutment member may include an abutment surface that varies longitudinally from the first abutment surface.

For example, a varying abutment surface is arranged between the first abutment surface and the second abutment surface.

The term "varying abutment surface" means a surface that limits the constraint-free travel of the stop portion to an amplitude that varies as a function of the longitudinal position of the input lever.

This device makes it possible to obtain progressive variation in the constraint-free travel that is available for the input lever.

Furthermore, the stop portion is optionally centered within the first abutment surface when the servo-control is supplied with hydraulic fluid at a pressure greater than a "minimum" pressure threshold, the distributor slide hydraulically isolating the chambers from the hydraulic inlet and the hydraulic outlet.

From a minimum pressure threshold, the input lever is centered in the first abutment surface. A pilot is then provided with force assistance, the travel speed of the cylinder of the servo-control depending on the movement of the input lever.

In an embodiment, the movement means include an actuator connected to the input lever and a control device suitable for giving an order to the actuator to move the input lever in longitudinal translation as a function of said order.

By way of example, such a device may comprise a pressure sensor, a sensor measuring the value of a predetermined monitoring parameter, a member operable by a pilot, such as a rotary knob, or indeed equipment such as an autopilot system, for example.

In a hydraulic embodiment, the movement means include a cavity, the movement means moving the input lever in longitudinal translation from a first position to a second position, and vice versa, as a function of a threshold referred to as "maximum" threshold for a pressure in said cavity.

The maximum threshold is higher than the above-mentioned minimum threshold.

For example, below the minimum threshold, the servo-control need not provide constraint-free assistance in operating a member.

As from the minimum threshold, the servo-control provides hydraulic assistance, the input lever then being in the first position so as to present constraint-free travel that is limited to the first amplitude.

Finally, from the maximum threshold, the servo-control provides hydraulic assistance. Furthermore, the input lever is then in the second position so as to present constraint-free travel that is possibly limited to a second amplitude.

In a first variant of this hydraulic embodiment, the servocontrol includes a hydraulic circuit delivering hydraulic fluid to a hydraulic inlet of a cylinder, the cavity being arranged in said hydraulic circuit.

By way of example, a pressure sensor can measure the pressure in the hydraulic circuit in order to control an actuator.

In a second variant of this hydraulic embodiment, the cavity is arranged in the control shaft within the cylinder, the control shaft being constrained to move in longitudinal translation with the input lever, the movement means including a fluid-flow connection connecting the cavity with said hydraulic inlet.

This variant presents the advantage of not requiring the use of a sensor and an actuator. The fluid delivered to the servo-control serves to move the control shaft and the input lever jointly.

Furthermore, the hydraulic valve may include a resilient member that keeps the control shaft in the first position below the maximum pressure threshold.

In addition, the control shaft may include a longitudinally extending elongate structure and an elongate arm secured to said elongate structure, said elongate arm extending longitudinally in parallel with said elongate structure, the elongate structure being connected to the input lever, the elongate arm sliding in an orifice in said distributor slide.

In this configuration, the control shaft may be moved in translation relative to the distributor slide.

Furthermore, the control shaft may project in part from the cylinder, having a non-projecting portion arranged in the cylinder and a projecting portion arranged outside the cylinder, the non-projecting portion being mechanically connected to the distributor slide, the projecting portion being mechanically connected to the input lever.

The servo-control then has a dynamic gasket between the projecting portion and a casing of the cylinder.

Under such circumstances, the connection between the distributor slide and a lever hinged to the distributor slide takes place in a protected environment within the servo-control.

Furthermore, the abutment member may include a clevis having a first cheek and a second cheek, at least one cheek having at least one first arcuate abutment surface, a space between said cheeks being suitable for having a control link of said linkage passing therethrough.

At least one cheek may also include at least one second arcuate abutment surface.

Finally, the input lever may be secured to the control shaft, or indeed it may be hinged to the control shaft.

For example, the input lever may be constrained to move in rotation with the input lever so that a rotary turn of the input lever causes the control shaft to turn.

In another element, the input lever may be hinged to the control shaft, possibly so that a movement in translation of the input lever causes the control shaft to turn.

In addition to a servo-control, the invention provides an aircraft having at least one servo-control of the invention connected to at least one hydraulic circuit.

The present invention also provides a method of fabricating the above-mentioned device.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIGS. 8 and 9 are diagrams showing a two-cylinder servo-control; and

FIG. 10 is a diagram showing a servo-control provided with an actuator.

Elements present in more than one of the figures are given the same references in each of them.

DETAILED DESCRIPTION OF THE INVENTION

Figure 1:
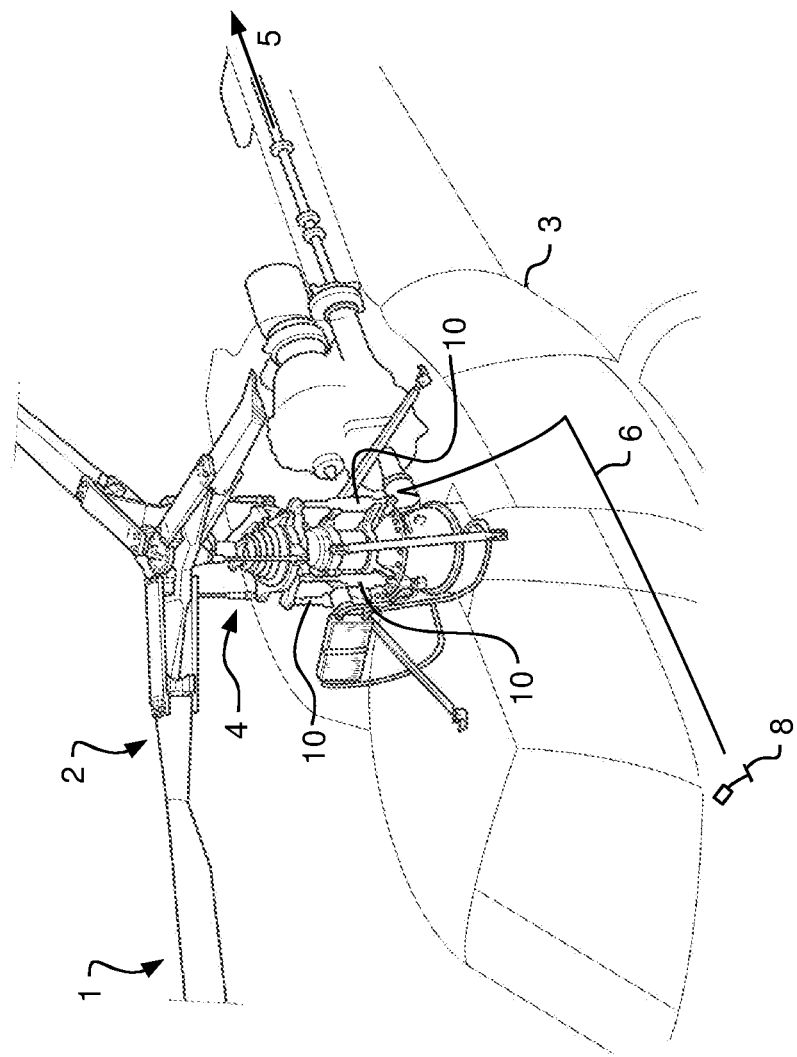
FIG. 1 is a view of an aircraft of the invention.

FIG. 1 shows an aircraft 1, and more particularly a rotorcraft having an airframe 3 carrying a main rotor 2 and a tail rotor 5 (not shown).

The aircraft 1 then has a set of swashplates 4 for adjusting the pitch of the blades of the main rotor 2. This set of swashplates is controlled by three servo-controls 10 that are connected to control means 8 by means of linkages 6.

Likewise, the linkage for controlling the pitch of the blades of the tail rotor 5 may include a servo-control that is not shown in FIG. 1.

Figure 2:
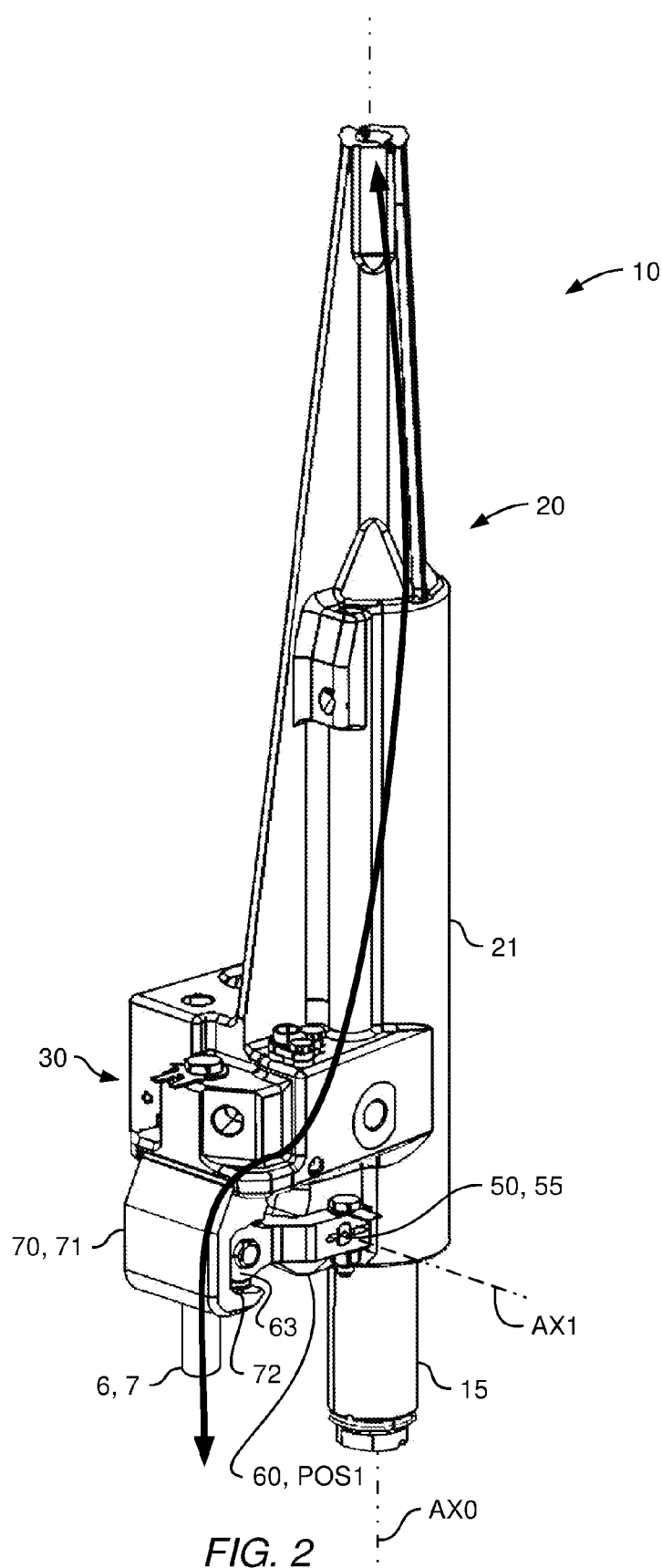
FIG. 2 is a view of a servo-control of the invention.

With reference to FIG. 2, each servo-control 10 of the invention comprises a cylinder 20 and a power rod 15.

The power rod has anchor means for anchoring to a structure. One such anchor means may be in the form of a hinge fastened to an anchor point of a structure.

Under such circumstances, each cylinder 20 is a movable cylinder, i.e. a cylinder that can slide along the power rod in a direction AX0 along which the power rod extends.

Conventionally, the cylinder 20 presents an outer casing 21. Such an outer casing 21 may comprise a single shell, or a plurality of shells that are connected to one another by conventional means.

The cylinder defines in particular an internal volume in which a piston of the power rod moves. This piston subdivides the internal volume into two chambers, namely an extension chamber and a retraction chamber.

In order to deliver fluid to the retraction chamber and the extension chamber, the cylinder 20 includes a hydraulic directional control valve 30. This hydraulic valve 30 receives a distributor slide. The distributor slide is movable relative to the outer casing in order to control the pressures that exist in the retraction chamber and the extension chamber.

In order to control the position of the distributor slide relative to the outer casing, the hydraulic valve has a control shaft 50 that is rotatable about a longitudinal axis AX1. A direction parallel to the longitudinal axis AX1 is substantially perpendicular to the direction AX0 in which the power rod extends. Likewise, a direction parallel to the longitudinal axis AX1 is substantially perpendicular to an axis of symmetry of the distributor slide.

The control shaft 50 is also mechanically connected to the distributor slide so that turning the control shaft about the longitudinal axis AX1 causes the distributor slide to move, e.g. causes the distributor slide to move in translation.

Furthermore, the servo-control includes an input lever 60 that is hinged to a control link 7 of a linkage 6. This linkage 6 leads to at least one pilot-operable control means.

The input lever 60 is also situated outside the associated cylinder 20.

Furthermore, the input lever 60 is mechanically connected to the control shaft. Thus, a movement of the input lever 60 performing a "first" movement leads to the control shaft 50 turning. As shown in FIG. 2, this first movement may be in the form of a turnabout the longitudinal axis AX1, or in another variant it may be in the form of a transverse movement in translation along a transverse direction. A direction parallel to the transverse direction is substantially perpendicular to the longitudinal axis AX1, for example.

The control shaft 50 projects in part from the cylinder 20. Under such circumstances, the control shaft has a non-projecting portion (not shown in FIG. 2) that is arranged inside the cylinder 20. Furthermore, the control shaft has a projecting portion 55 that is arranged outside the cylinder 20. The non-projecting portion is then mechanically connected to the distributor slide, while the projecting portion is mechanically connected to the input lever 60.

For example, the input lever 60 of FIG. 2 is secured to the control shaft 50. Thus, a first turning movement of the input lever about the longitudinal axis AX1 causes the control shaft 50 to turn.

In another example, the input lever is connected to the control shaft via a conventional mechanical connection so that a movement in transverse translation of the input lever causes the control shaft 50 to turn.

Furthermore, the input lever has a "stop" portion 63. For example, the linkage 6 is hinged to the stop portion 63.

The stop portion 63 optionally includes an arcuate stop surface, or indeed, in particular, a surface that is at least partially circular.

Under such circumstances, the servo-control has an abutment member 70 in which the stop portion 63 moves at least in part. The abutment member serves to adjust the constraint-free travel of the input lever when the input lever performs a said first movement.

This abutment member 70 is secured to the cylinder 20 by conventional means such as screws, rivets, adhesive, or welding, for example.

Furthermore, the abutment member 70 presents at least one "first" abutment surface. For example, at least one abutment surface is an arcuate surface, or indeed a surface that is in particular at least partially circular. The first abutment surface 72 serves to limit the constraint-free travel amplitude of the stop portion 63 to a first amplitude 201 under certain conditions.

The abutment member may also include a varying abutment surface and/or a second abutment surface limiting the first constraint-free movement of the input lever to a second amplitude that is different from the first amplitude.

Figure 5:
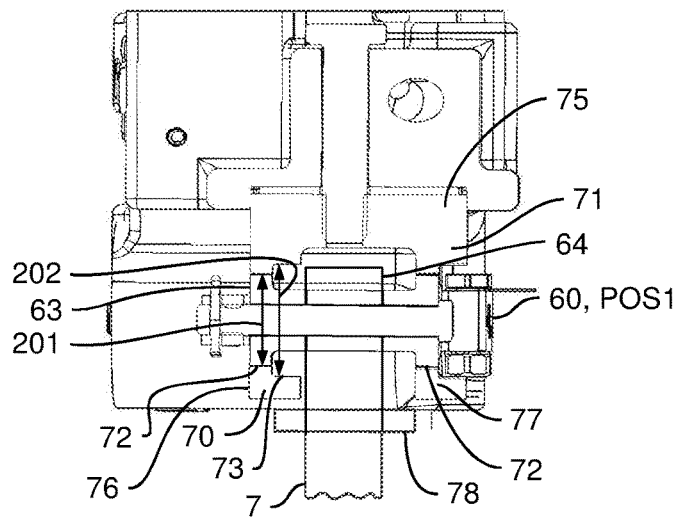
FIGS. 5 and 7 are sections showing a servo-control cylinder in a hydraulic embodiment and in a second position.

In the variant of FIG. 5, the abutment member 70 may include a clevis 75. The clevis 75 has a first cheek 76 and a second cheek 77.

There is a space 78 between the cheeks 76 and 77. Consequently, a control link 7 of the linkage 6 can pass through this space in order to be hinged to the stop portion by a hinge 64.

Furthermore, at least one of the cheeks 76, 77 includes at least one first abutment surface 72. At least one of the cheeks 76, 77 may also include at least one second abutment surface 73.

In the example of FIG. 5, each cheek presents a first abutment surface 72 and a second abutment surface 73. In other variants there may optionally be a varying abutment surface, e.g. varying between the first abutment surface and the second abutment surface.

Furthermore, the servo-control 10 has movement means that are not shown in FIG. 5. The function of the movement means is to move the input lever 60 longitudinally to perform a "second" movement that is different from the first movement that serves to turn the control shaft.

Thus, the movement means can move in longitudinal translation along the longitudinal axis AX1 of the input lever 60 between a first position POS1, included, and a second position (not shown in FIG. 5), included.

The movement means serve in particular to move the input lever as a function of at least one predetermined condition. Such a predetermined condition may correspond to a pressure condition, a condition of a pilot-operable member being activated, or an execution condition issued by equipment of the aircraft.

Under such circumstances, when the input lever 60 is in the first position POS1, the first abutment surface 72 limits the constraint-free travel amplitude of the stop portion 63 to a first amplitude 201. In contrast, when the input lever 60 is in the second position POS2 (shown in FIG. 7), the second abutment surface 72 limits the constraint-free travel amplitude of the stop portion 63 to a second amplitude 202.

Figure 3:
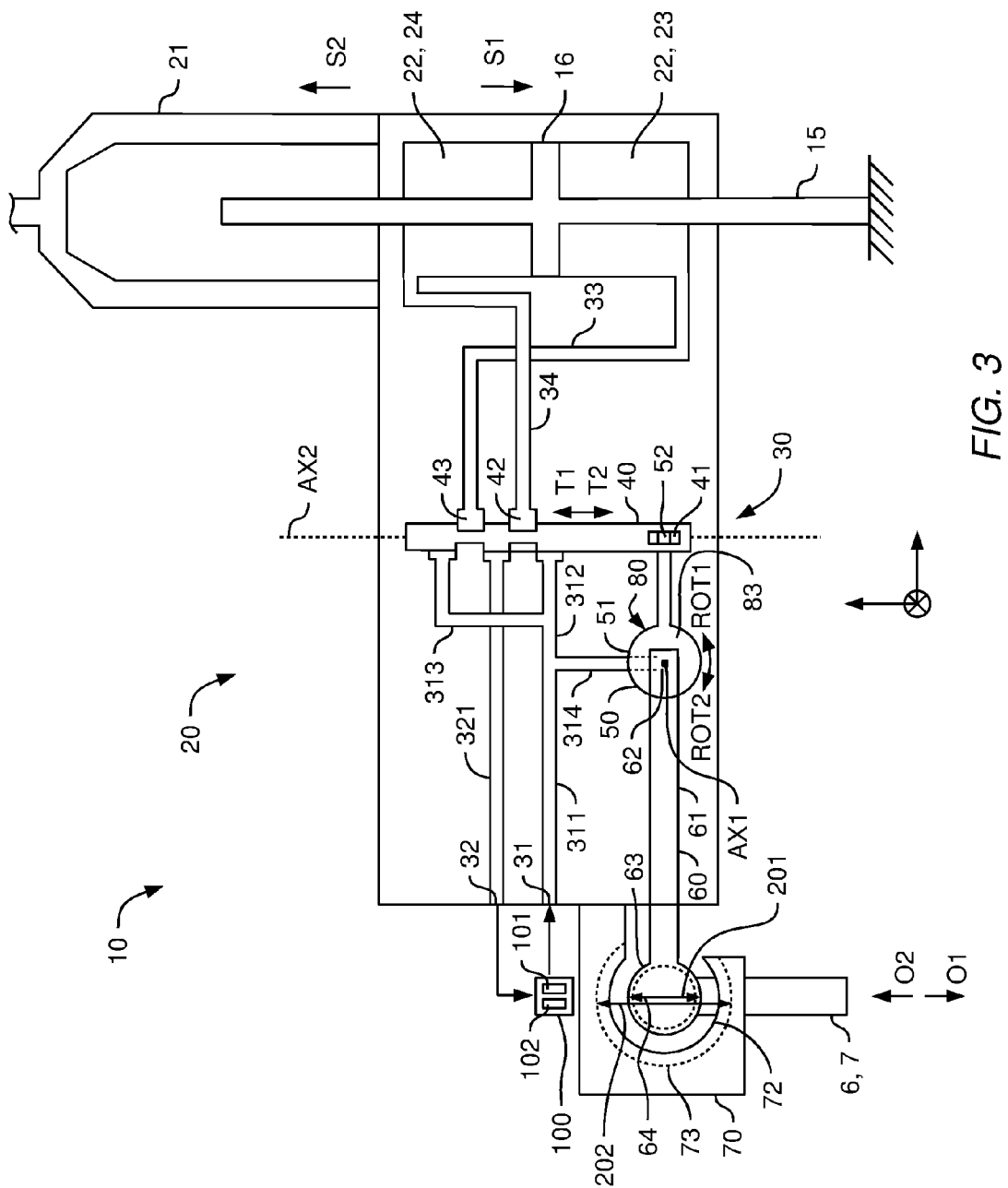
FIG. 3 is a diagram showing a single-cylinder servo-control in a hydraulic embodiment.

FIG. 3 shows a single-cylinder servo-control in a hydraulic embodiment.

Independently of the embodiment, the servo-control has a power rod 15 provided with one piston 16 per cylinder 20. Each piston 16 defines within the casing 21 of the associated cylinder a chamber 22 referred to as a "retraction" chamber 23 and a chamber 22 referred to as an "extension" chamber 24.

Under such circumstances, the cylinder 20 has a hydraulic directional control valve 30 connected to a hydraulic circuit 100. Thus, the hydraulic valve has at least one hydraulic inlet 31 connected to a fluid delivery system 101 and at least one hydraulic outlet 32 connected to a fluid discharge system 102 of the hydraulic circuit 100.

Each hydraulic valve 30 also has a "retraction" channel 33 that leads to the retraction chamber 23, and an "extension" channel 34 that leads to the extension chamber 24. Under such circumstances, the hydraulic valve 30 includes a distributor slide 40 interposed between firstly the retraction channel 33 and the extension channel 34, and secondly the hydraulic inlet 31 and the hydraulic outlet 32.

The distributor slide may for example comprise a spool having a first groove 42 and a second groove 43.

Furthermore, the hydraulic valve includes a control shaft 50 connected to the distributor slide. A rotary turning movement ROT1, ROT2 of the control shaft causes the distributor slide to move.

By way of example, in a neutral position of the input lever, none of the grooves is in communication with the hydraulic inlet 31 or the hydraulic outlet 32. The piston is in a middle position within the volume that the piston subdivides into two chambers 22.

In contrast, an order O1 from a pilot may request the input lever to move into a retraction position. Under such circumstances, the control shaft performs a first rotary turn ROT1 in the counterclockwise direction as shown in FIG. 3.

This first rotary turn ROT1 causes the distributor slide to move, and more particularly causes it to perform a first upward movement in translation T1 in FIG. 3. The second groove 43 then connects the hydraulic inlet 31 to the retraction channel 33 via ducts 311 and 313. The first groove 42 then connects the hydraulic outlet 32 to the extension channel 34 via a duct 321.

Under such circumstances, the cylinder 20 is moved in translation along arrow S1.

In contrast, the control link 7 remains stationary. Under such circumstances, the movement in translation of the cylinder 20 causes the control shaft to move relative to the input lever. This movement ends up by causing the input lever, the control shaft, and the distributor slide to be repositioned in the neutral position of FIG. 1.

Likewise, a second order O2 from the pilot can request the input lever to move in an extension direction. Under such circumstances, the control shaft performs a secondary rotary turn ROT2 in the clockwise direction in the example of FIG. 3.

This second rotary turn ROT2 causes the distributor slide to move, and more particularly causes it to perform a second movement in translation T2 towards the bottom of FIG. 3. The first groove 42 then connects the hydraulic inlet 31 to the extension channel 34 via ducts 311 and 312. The second groove 43 connects the hydraulic outlet 32 to the retraction channel 33 via a duct 321.

Under such circumstances, the cylinder 20 is moved in translation along arrow S2.

Furthermore, the control shaft 50 has an elongate structure 51 extending longitudinally along a longitudinal axis AX1. In addition, the control shaft 50 includes an elongate arm 52 secured to the elongate structure 51. The elongate arm 52 extends longitudinally parallel to the elongate structure 51. Additionally, the elongate arm 52 can slide in an orifice 41 in the distributor slide 40. Under such circumstances, turning the control shaft causes the distributor slide to move in translation.

Furthermore, the control shaft is mechanically connected to the input lever 60. In particular, the elongate structure 51 is mechanically connected to the input lever 60.

This input lever 60 is also provided with a hinge 64 connected to the control link 7 of the linkage 6. This hinge 64 may be carried by the stop portion 63 of the input lever 60.

This stop portion 63 is arranged within the abutment member 70.

Under such circumstances, the abutment member has at least one first abutment surface 72 limiting the first movement of the input lever to a first amplitude 201 when the input lever is positioned in the first position POS1 by the movement means.

In the embodiment of FIG. 3, the movement means comprise a hydraulic device applied to a single-cylinder servo-control.

The hydraulic device includes a cavity 83.

The movement means 80 then move the input lever 60 in longitudinal translation from a first position POS1 to a second position, and vice versa, as a function of a threshold in a pressure that exists in the cavity 83 and referred to as the "maximum" threshold. If the pressure in the cavity is below the maximum threshold, then the input lever is in the first position. In contrast, if the pressure in the cavity is above the maximum threshold, then the input lever is moved into the second position.

The cavity may be arranged in the hydraulic circuit 100.

In contrast, in the embodiment shown in FIG. 3, the cavity is arranged in the cylinder of the servo-control. The cavity 83 is connected to the hydraulic inlet 31 via a fluid flow link 314 of the movement means 80.

Figure 4:
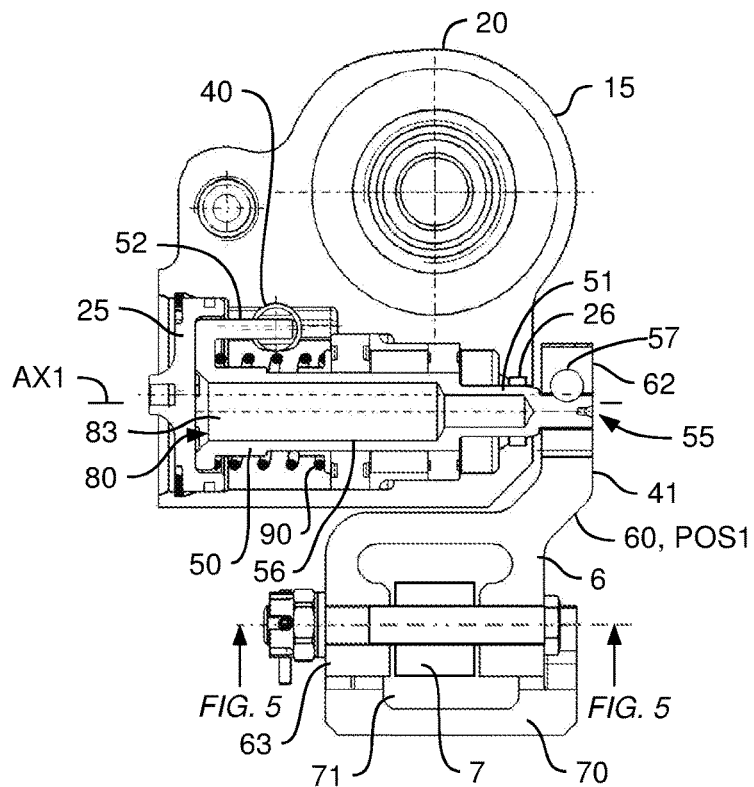
FIGS. 4 and 6 are section views showing a servo-control cylinder in a hydraulic embodiment and in a first position.

With reference to FIG. 4, this cavity 83 is defined in part by the control shaft 50 and an end wall 25 of the casing of the cylinder. The end wall 25 may be removable.

Under such circumstances, the control shaft 50 is constrained to move in longitudinal translation together with the input lever 60.

For this purpose, the control shaft 50 includes a non-projecting portion 56 arranged inside the cylinder 20 and a projecting portion 55 arranged outside the cylinder 20.

The non-projecting portion 56 is mechanically linked to the distributor slide 40 by the elongate arm 52. In contrast, the projecting portion 55 is mechanically linked to the input lever 60. More particularly, in the embodiment of FIG. 4, the projecting portion 55 is secured to the input lever 60 by conventional means 57. Consequently, the input lever has a rod 61 extending from the stop portion 63 to an end 62 that is connected to the control shaft.

Furthermore, a gasket 26 is arranged between the control shaft and the casing of the servo-control cylinder.

In order to prevent the input lever moving below the maximum threshold, the hydraulic valve 30 includes a resilient member 90. This resilient member 90 may comprise a block of elastic material or indeed a spring, as shown in FIG. 4.

The resilient member 90 exerts a force on the control shaft 50 in order to hold the control shaft 50 in the first position POS1 below the maximum pressure threshold.

FIG. 10 shows an alternative embodiment for movement means.

In this embodiment, the input lever 60 can slide along the control shaft 50. For example, the input lever is constrained to move in rotation with the control shaft 50 by fluting 54.

Under such circumstances, the movement means 80 comprise an actuator 81 connected to the input lever 60. The actuator 81 may be a hydraulic, pneumatic, or electric jack that is suitable for causing the input lever to slide in longitudinal translation along the control shaft.

Furthermore, the movement means possess a control device 82 suitable for giving an order to the actuator 81 to move the input lever in longitudinal translation as a function of said order.

By way of example, the control device 82 may comprise a pressure sensor arranged in a hydraulic circuit, a button operated by a pilot, equipment for determining the position that the input lever is to reach, a sensor measuring the value of a monitoring parameter of the aircraft, . . . .

FIGS. 4 to 7 explain the operation of the invention on a single-cylinder servo-control. This method is explained on the basis of the hydraulic embodiment shown in FIG. 3, however it could be performed using the embodiment of FIG. 10.

With reference to FIGS. 4 and 5, when the hydraulic circuit is not delivering fluid to the servo-control, the input lever 60 is in the first position POS1 facing the abutment member 70. The stop portion 63 of the input lever is then facing the first abutment surface 72 of the abutment member.

The input lever 60 can perform a first constraint-free movement through a first amplitude within the abutment member 70 in order to move the control shaft 55.

The servo-control then provides no hydraulic assistance.

In contrast, when the stop portion comes into contact with the abutment member, the stop portion can move the abutment member without stress and can consequently move the servo-control cylinder.

The cylinder 20 of the servo-control can than behave like a link.

When the hydraulic circuit is delivering fluid to the servo-control, the input lever 70 remains in the first position so long as a first condition is not satisfied.

For example, the input lever 60 is maintained in the first position POS1 so long as the pressure in the servo-control is less than a maximum pressure threshold. For example, this maximum thresholds is about 40 bars.

In the embodiment of FIG. 4, the resilient member 90 is dimensioned so as to keep the control shaft and the input lever in the first position POS1 so long as the first condition is not satisfied.

Nevertheless, the servo-control can provide hydraulic assistance if a second condition is satisfied.

Thus, and by way of example, the servo-control may provide hydraulic assistance as soon as the pressure in the servo-control reaches a minimum pressure threshold. This minimum pressure threshold is less than the maximum threshold, being of the order of 10 bars, for example.

Once the second condition is satisfied, and with reference to FIG. 5, the intrinsic operation of the servo-control causes the stop portion 63 to be centered within the first abutment surface 72. The input lever is in a neutral position. In this neutral position, the distributor slide 40 isolates the chambers 22 hydraulically from the hydraulic inlet 31 and from the hydraulic outlet 32.

If the input lever is not centered when the minimum threshold is reached, then the input lever shifts the distributor slide relative to its neutral position. Under such circumstances, hydraulic fluid is conveyed to a chamber of the servo-control. Because of the pressure of the fluid, this fluid causes the cylinder of the servo-control to move towards its neutral position.

Consequently, the input lever is then in a centered position within the abutment member.

The input lever may be moved without stress by flight controls to perform a first movement of a first amplitude 201 in order to request hydraulic assistance from the servo-control.

This first amplitude is small for a single-cylinder servo-control. For example, the first amplitude is of the order of plus or minus one millimeter relative to the neutral position.

This small amount of slack allows the servo-control to assist the pilot, while nevertheless giving a relatively small travel speed to the servo-control.

Figure 6:
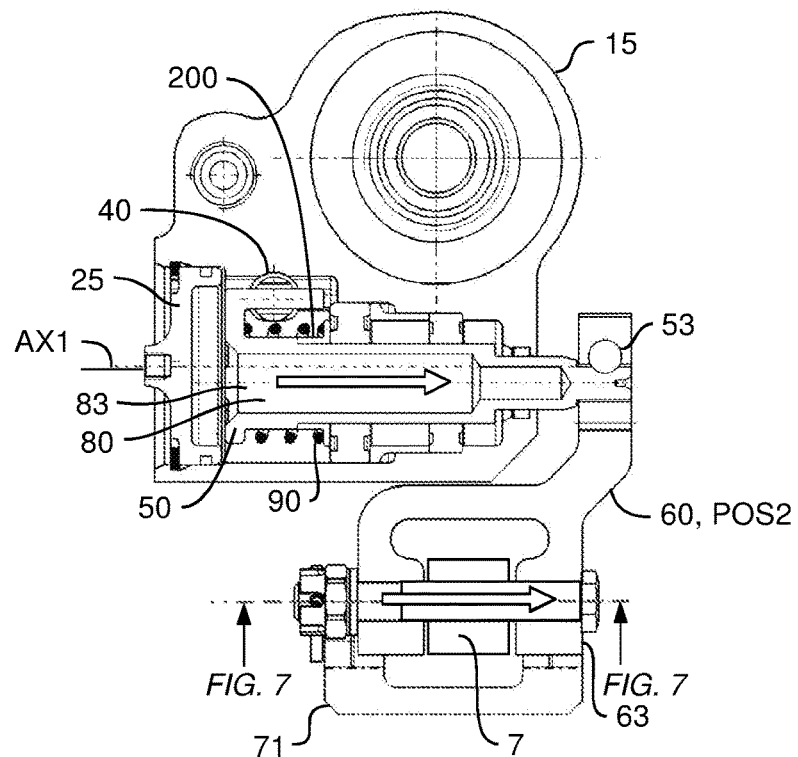

With reference to FIG. 6, when the first condition is satisfied, the input lever 60 is moved by the movement means 80 towards a second position POS2.

In the embodiment of FIG. 6, the pressure in the cavity 83 generates a force on the control shaft that is greater than the return force exerted by the spring 90. The control shaft 50 and the input lever then move jointly in longitudinal translation along the longitudinal axis AX1. This longitudinal translation movement may be interrupted by an abutment 200 of the cylinder of the servo-control, a shoulder of the control shaft coming into contact with said abutment 200. The input lever and the control shaft are then in a second position POS2.

It should be observed that the abutment member does not impede the transition from the first position POS1 to the second position POS2, since the input lever is previously centered in the abutment member.

Figure 7:
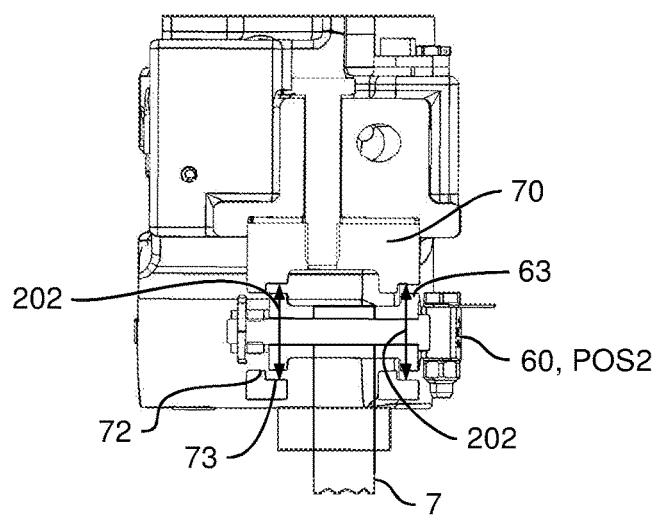

With reference to FIG. 7, the stop portion 63 of the input lever 60 then no longer faces the first abutment surface.

In contrast, the stop portion may be facing a second abutment surface 73.

Consequently, the input lever can then be moved without stress by the flight controls with a first movement over a second amplitude 202 in order to request hydraulic assistance from the servo-control.

This second amplitude is greater than the first amplitude in a single-cylinder servo-control. For example the second amplitude is of the order of plus or minus three millimeters relative to the neutral position.

This large amount of slack enables the servo-control to assist the pilot, while nevertheless imparting a relatively fast travel speed to the servo-control.

In the event of a hydraulic failure, the movement means position the input lever in the first position POS1. As a result of the hydraulic failure, constraint-free movement of the input lever within the limits of the first amplitude has no influence. In contrast, as soon as the input lever comes into abutment against the abutment member, the input lever then moves the cylinder of the servo-control against opposing stress. The cylinder then behaves like a link.

Figure 8:
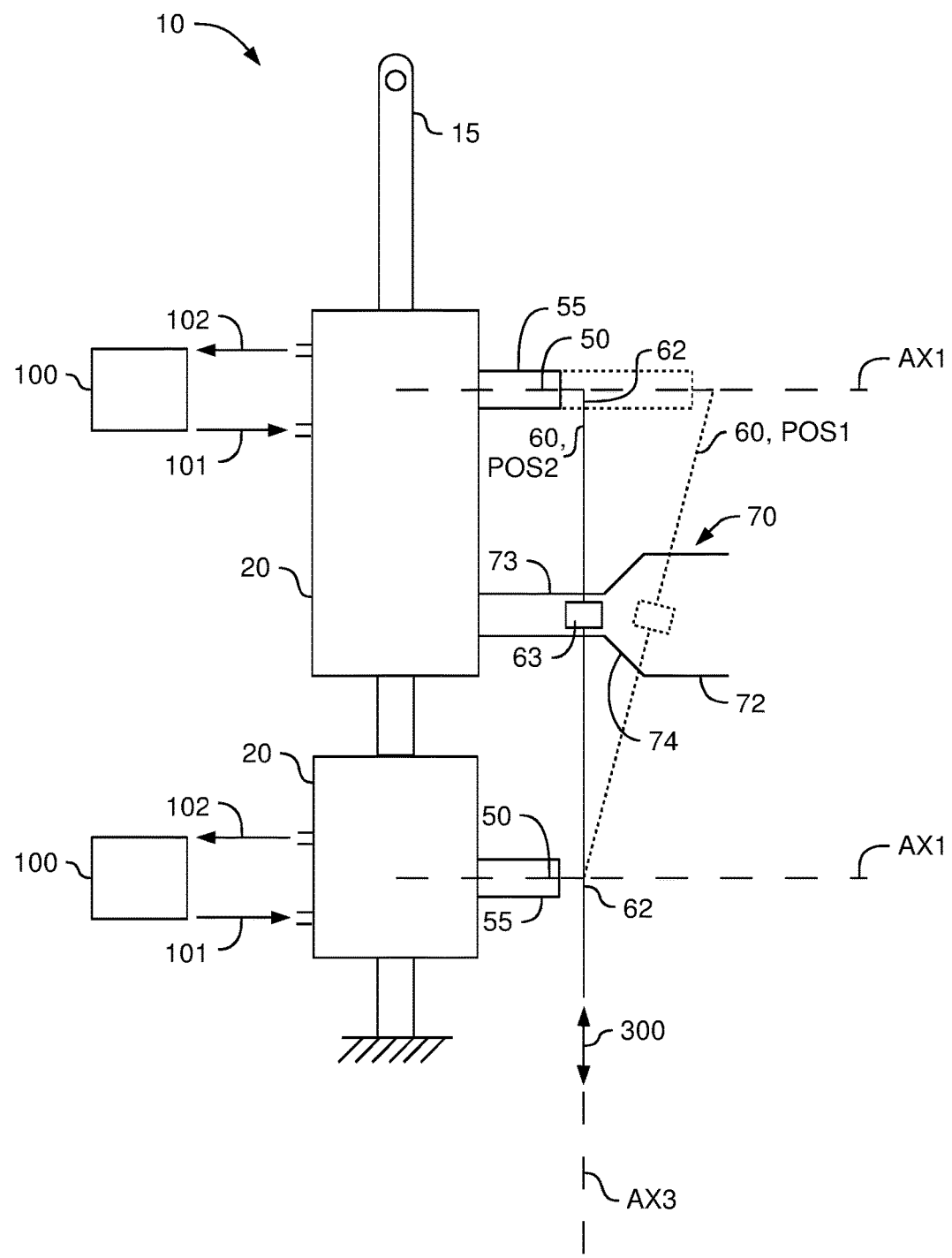

FIGS. 8 and 9 show a servo-control of the invention having at least two cylinders.

Each cylinder includes a hydraulic directional control valve with a distributor slide co-operating with a control shaft 50.

Furthermore, the control shafts 50 of the cylinders are mechanically connected to an input lever 60.

In FIG. 9, the input lever 60 is hinged to each of the control shafts. A movement in transverse translation of the input lever as shown by double-headed arrow 300 thus causes each of the control shafts to turn.

Furthermore, and with reference to FIG. 8, the input lever 60 has a stop portion 63 arranged in an abutment member 70. This abutment member is secured to a cylinder of the servo-control.

When the first condition is satisfied for each of the cylinders, each input lever is in the second position POS2 that is drawn with continuous lines.

The travel of the input lever is limited by the abutment member to a second amplitude that is small in order to avoid the servo-control being too reactive.

In contrast, if the hydraulic circuit delivering fluid to a cylinder fails, then the control lever returns to its first position POS1. In the example shown, the control shaft of the top cylinder of the servo-control is moved longitudinally.

Under such circumstances, the constraint-free travel of the input lever is limited by the abutment member to a first amplitude that is large in order to be able to increase the performance of the cylinder that remains in operation.

Likewise, when stopped or when only the second condition is satisfied for each of the cylinders, the input lever is in a first position POS1 in which the travel of the input lever is limited by the abutment member to a first amplitude.

In the context of a servo-control having a plurality of cylinders, the input lever is in the first position POS1 when the first condition is not satisfied for at least one of the cylinders.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A servo-control having at least one movable cylinder and a stationary power rod, the power rod having one piston per cylinder, each piston defining a chamber referred to as a "retraction" chamber and a chamber referred to as an "extension" chamber in a casing of the cylinder,
    each cylinder including a hydraulic directional control valve provided with at least one hydraulic inlet suitable for being connected to a fluid delivery system and at least one hydraulic outlet suitable for being connected to a fluid discharge system,
    each hydraulic valve of a cylinder comprising at least one hydraulic distributor slide movable within the hydraulic valve in order to put each chamber of the cylinder on request into fluid flow communication with the hydraulic inlet or the hydraulic outlet,
    the hydraulic valve having a control shaft that is rotatable about a longitudinal axis, the servo-control including an input lever situated outside each cylinder,
    the input lever being suitable for being connected to a linkage for generating a movement order for the servo-control,
    wherein the control shaft is connected to the distributor slide so that a rotary turn of the control shaft causes the distributor slide to move,
    the input lever being connected to the control shaft and being movable with a first movement to cause the control shaft to turn,
    the servo-control including a stationary abutment member secured to at least one of the cylinders,
    the abutment member having at least a first abutment surface, the input lever including a stop portion co-operating with the abutment member,
    the servo-control including movement means for moving the input lever in a second movement in longitudinal translation from a first position to a second position and vice versa as a function of a predetermined condition,
    the first abutment surface limiting press-free travel of the stop portion during a first movement to a first amplitude solely when the input lever is in the first position.

2. A servo-control according to claim 1, wherein the abutment member includes a second abutment surface distinct from the first abutment surface, the second abutment surface limiting the travel amplitude of the stop portion during the first movement to a second amplitude when the input lever is in the second position, the second amplitude being different from the first amplitude.

3. A servo-control according to claim 1, wherein the abutment member includes an abutment surface that varies longitudinally from the first abutment surface.

4. A servo-control according to claim 1, wherein the stop portion is centered within the first abutment surface when the servo-control is supplied with hydraulic fluid at a pressure greater than a "minimum" pressure threshold, the distributor slide hydraulically isolating the chambers from the hydraulic inlet and the hydraulic outlet.

5. A servo-control according to claim 1, wherein the movement means include an actuator connected to the input lever and a control device suitable for giving an order to the actuator to move the input lever in longitudinal translation.

6. A servo-control according to claim 1, wherein the movement means include a cavity, the movement means moving the input lever in longitudinal translation from a first position to a second position, and vice versa, as a function of a threshold referred to as "maximum" threshold for a pressure in the cavity.

7. A servo-control according to claim 6, wherein the servo-control includes a hydraulic circuit delivering hydraulic fluid to a hydraulic inlet of a cylinder, the cavity being arranged in the hydraulic circuit.

8. A servo-control according to claim 6, wherein the cavity is arranged in the control shaft within the cylinder, the control shaft being constrained to move in longitudinal translation with the input lever, the movement means including a fluid-flow connection connecting the cavity with the hydraulic inlet.

9. A servo-control according to claim 8, wherein the hydraulic valve includes a resilient member that keeps the control shaft in the first position below the maximum pressure threshold.

10. A servo-control according to claim 1, wherein the control shaft includes a longitudinally extending elongate structure and an elongate arm secured to the elongate structure, the elongate arm extending longitudinally in parallel with the elongate structure, the elongate arm sliding in an orifice in the distributor slide.

11. A servo-control according to claim 1, wherein the control shaft projects in part from the cylinder, having a non-projecting portion arranged in the cylinder and a projecting portion arranged outside the cylinder, the non-projecting portion being mechanically connected to the distributor slide, the projecting portion being mechanically connected to the input lever.

12. A servo-control according to claim 1, wherein the abutment member includes a clevis having a first cheek and a second cheek, at least one cheek having at least one first arcuate abutment surface, a space between the cheeks being suitable for having a control link of the linkage passing therethrough.

13. A servo-control according to claim 12, wherein at least one cheek includes at least one second arcuate abutment surface.

14. A servo-control according to claim 1, wherein the input lever is secured to the control shaft.

15. A servo-control according to claim 1, wherein the input lever is hinged to the control shaft.

16. A servo-control according to claim 1, wherein the stop portion includes a hinge suitable for being connected to the linkage.

17. An aircraft, including at least one servo-control according to claim 1.

* * * * *